Patented Mar. 10, 1942

2,276,189

UNITED STATES PATENT OFFICE 2,276,189

TREATMENT OF HYDROCARBONS

Aristid V. Grosse and Carl B. Linn, Chicago, Ill., assignors to Universal Oil Products Company, Chicago, Ill., a corporation of Delaware No Drawing. Application March 31, 1939, Serial No. 265,141

7 Claims. (Cl. 196—10)

In one particular aspect, this invention relates to the treatment of paraffin hydrocarbons which are gaseous at ordinary temperatures and pressures, particularly the butanes.

In a more specific sense the invention is concerned with a novel process for reacting paraffin hydrocarbon such as butanes with acetylene to produce saturated hydrocarbons of higher molecular weight which can be utilized as constituents of motor fuel for automobile and airplane engines.

In one application of the present process butanes present in cracked gas mixtures are utilized as sources of additional yields of motor fuel fractions to augment those primarily produced by the cracking operation. The process is applicable to selected hydrocarbon fractions obtained as overhead products in the stabilization of cracked distillates and it is also applicable to the treatment of butanes produced from any other source.

In one specific embodiment the present invention comprises a process for reacting butanes with acetylene to form higher-boiling paraffinic hydrocarbons while utilizing a temperature in the approximate range of 0–50° C., a pressure of the order of 7–22 atmospheres, and a catalyst consisting essentially of aluminum chloride and hydrogen chloride.

As a basis for the present invention, we have determined that reaction of butanes with acetylene to form paraffinic hydrocarbons may be effected with a comparatively low degree of secondary reactions if sufficient pressure is imposed upon the reaction zone to maintain substantially liquid phase conditions at all times and if a considerable excess of the butane is present. As will be indicated in the experimental data in a later section, the temperature of the reaction can be safely raised to 50° C. without substantial reduction in yield of gasoline boiling range material, although there is a diminution in the yields of decanes corresponding to products of primary reactions when higher temperatures are employed. The use of temperatures of approximately 25–50° C., together with superatmospheric pressures is accompanied by an increase in the rate of reaction and an increased capacity of commercial equipment so that when the main object is the production of high antiknock gasoline boiling range material, the present type of operation is preferable over the use of temperatures below 0° C. without imposed pressure. Also at temperatures below 0° C. the rate of reaction between butanes and acetylene is of a relatively low order.

The total reactions occurring when isobutane or normal butane is reacted with acetylene within the approximate range of conditions specified will involve, to some extent, simply the addition of two molecules of the paraffin to one molecule of acetylene to form isomeric decane. Although the mechanisms of the reactions involved are not known clearly or completely, hexenes may be formed as intermediate products by the reaction of one molecule of a butane with acetylene. Such hexene then may react with another molecule of a butane producing a decane. The intermediately formed hexene may also undergo polymerization rather than alkylation by n- or isobutane. Decanes resulting from such stepwise reactions may decompose in the presence of the catalyst to produce lower boiling paraffins and olefins and the latter may undergo further interaction with a butane so that the net result is the production of a mixture of hydrocarbons having a considerable boiling range, but containing a relatively large proportion of relatively low boiling paraffin hydrocarbons.

The actual operation of the process admits of some modification depending upon whether batch or continuous operations are employed. In batch operation wherein substantially only butanes and acetylene are concerned, the paraffin is maintained in liquid phase by the application of sufficient pressure at the temperature chosen for the treatment. Finely divided anhydrous aluminum chloride is maintained in suspension by agitation or rotation of the pressure vessel and the reaction is effected by the gradual introduction of acetylene and a small amount of hydrogen chloride under the surface of the liquid. After a treatment is completed the aluminum chloride layer is allowed to settle, the pressure is released, the upper hydrocarbon layer is removed by decantation and subjected to fractionation for the removal of uncombined hydrocarbons as a light overhead and the recovery of the desired motor fuel fractions.

Continuous operations may be conducted by passing a proportioned mixture of butane or isobutane and acetylene containing suspended therein a small amount of anhydrous aluminum chloride through a tubular heating element at the entrance to which a small amount of hydrogen chloride is injected. The products from the heater are then discharged into a separator from which the spent catalyst is withdrawn as a lower layer and the upper hydrocarbon layer is pumped to a fractionator to remove the uncombined low boiling hydrocarbons as an overhead fraction and produce gasoline boiling range material as an intermediate cut. In cases where there is any considerable production of material boiling higher than the end point of commercial gasoline, fractionating of the hydrocarbon layer may be done in two stages, the first stage removing the uncombined 4-carbon atom hydrocarbons and being in effect a stabilization, and the second stage distilling the gasoline boiling range material as an overhead. Details of such continuous procedures are more or less familiar to those conversant with refinery operations, and other procedures than those mentioned may suggest themselves which can be made without departing from the general scope of the invention.

The present process can be utilized successfully to produce paraffinic hydrocarbons which are largely of isomeric structure from the mixture of 4-carbon atom hydrocarbons obtainable, either by close fractionation of the heavier portions of natural gas, or of the paraffinic constituents of cracked gas mixtures, such as those produced as overhead from cracking plant stabilizers.

In the treatment of such mixtures with condensing catalysts, such as aluminum chloride and hydrogen chloride, conditions can be regulated so that the primary reactions involve principally the interaction of the iso compounds and the primary liquid products are those formed by the interaction of isobutane with acetylene.

In the presence of an excess of isobutane or normal butane, it has been found that one molecule of acetylene tends to react with twice its molecular equivalent of butane while the excess butane remains unaffected. When more acetylene is used than corresponds to about one mole to 4 moles of butane there is an increased tendency for polymerization reactions to occur. However, by maintaining the proper excess of the paraffin hydrocarbon the course of the reaction may be kept principally in the direction of production of reaction products of a saturated rather than an unsaturated character.

The process may be utilized for the direct improvement of low antiknock value gasolines by suspending aluminum chloride therein at the required temperature and passing either a proportioned mixture of isobutane and/or n-butane and acetylene into the suspension along with hydrogen chloride, or simply by passing acetylene and hydrogen chloride into the same gasoline. The gasoline functions both as a solvent and as a reaction medium so that the reaction products are formed and blended with the gasoline at the same time to increase its antiknock value to an extent depending upon the amount of products formed by the interaction of acetylene and the other hydrocarbons. Paraffinic gasolines, particularly at the higher temperatures of operation, will undergo some decompositions and rearrangements from the action of the aluminum chloride so that the net result will be a marked increase in the antiknock value of the original gasoline.

The following numerical data are presented to indicate some of the results obtainable in effecting the interaction of acetylene and butanes by the present process, although it is not intended to thereby limit the scope of the invention.

*Example I*

A pressure vessel was charged with 22.5 parts by weight of aluminum chloride, 17.6 parts by weight of hydrogen chloride, and 175 parts by weight of isobutane. At 26° C. the vapor pressure of this mixture was 9.5 atmospheres. While acetylene was then introduced to raise the pressure to 11 atmospheres the temperature increased to 50° C., after which the pressure dropped rapidly to 9.2 atmospheres. Similar additions of acetylene were made at intervals of one-half hour, a marked temperature effect being noted each time until approximately fifteen such additions had been made. After being stirred in the autoclave for 20 hours there were recovered 5 parts by weight of hydrogen chloride, 70 parts by weight of aluminum chloride sludge, 62 parts by weight of condensable gas, and 83 parts by weight of liquid products consisting of relatively low boiling paraffin hydrocarbons with pentanes, hexanes, heptanes, and octanes as main products.

Similar production of paraffinic hydrocarbon fractions occurred when isobutane and acetylene were reacted at temperatures in the range of 0–10° C. under a pressure of 11 atmospheres in the presence of anhydrous aluminum chloride and hydrogen chloride. The extent of such reaction was slight, however, when relatively small amounts of hydrogen chloride were employed in connection with the previously used quantity of aluminum chloride.

The results of these runs show that iso-butane reacts with acetylene and produces higher paraffinic hydrocarbons, but that decane, which might be predicted as a primary product, is apparently converted largely into other lower boiling paraffinic hydrocarbons.

*Example II*

In a manner similar to that used in Example I, 175 parts by weight of n-butane, 22 parts by weight of anhydrous aluminum chloride, and 25.5 parts by weight of hydrogen chloride were reacted at 25–30° C. with 20 parts by weight of acetylene under a pressure ranging between 9.5 and 14.5 atmospheres. The acetylene was absorbed readily, but less so than in Example I in which it reacted with iso-butane. The reaction product was similar to that obtained from iso-butane but only 40 parts by weight of liquid resulted. This liquid product had the same characteristic as that derived from isobutane, according to distillation data, chemical analyses, densities, and refractive indices.

The character of the process of the present invention, and particularly its commercial value, are evident from the preceding specification and limited numerical data presented, although neither section is intended to be unduly limiting in its generally broad scope.

We claim as our invention:

1. A process for producing gasoline boiling range hydrocarbons which comprises subjecting iso-butane and acetylene to contact with aluminum chloride and hydrogen chloride at a temperature in excess of 0° C. but not appreciably above 50° C. and under sufficient superatmospheric pressure to maintain a substantial portion of the butane in liquid phase.

2. A process for producing gasoline boiling range hydrocarbons which comprises contacting iso-butane and acetylene with aluminum chloride and hydrogen chloride at a temperature in excess of 0° C. but not substantially above 50° C. and under a pressure in the approximate range of 7–22 atmospheres.

3. A process for producing gasoline boiling range hydrocarbons which comprises subjecting normal butane and acetylene to contact with aluminum chloride and hydrogen chloride at a temperature in excess of 0° C. but not appreciably above 50° C. and under sufficient superatmospheric pressure to maintain a substantial portion of the butane in liquid phase.

4. A process for producing gasoline boiling range hydrocarbons which comprises contacting normal butane and acetylene with aluminum chloride and hydrogen chloride at a temperature in excess of 0° C. but not substantially above 50° C. and under a pressure of the approximate order of 7–22 atmospheres.

5. A process for increasing the antiknock value of gasoline which comprises adding aluminum chloride to the gasoline, passing a butane, acetylene, and hydrogen chloride into the resultant mixture, maintaining the mixture at a temperature in excess of 0° C. but not appreciably above 50° C. and under sufficient superatmospheric pressure to maintain a substantial portion of the butane in liquid phase.

6. A process for increasing the antiknock value of gasoline which comprises adding aluminum chloride to the gasoline, passing acetylene and hydrogen chloride into the resultant mixture, maintaining the mixture at a temperature in excess of 0° C. but not substantially above 50° C. whereby to alkylate paraffinic portions of the gasoline, and recovering the gasoline containing the alkylated derivatives thus formed.

7. A process for producing hydrocarbons boiling in the gasoline range which comprises reacting a butane with acetylene in the presence of aluminum chloride and hydrogen chloride at a temperature in excess of 0° C. but not appreciably above 50° C. and under sufficient superatmospheric pressure to maintain a substantial portion of the butane in liquid phase.

ARISTID V. GROSSE.
CARL B. LINN.